United States Patent
Dong et al.

(10) Patent No.: US 11,842,303 B2
(45) Date of Patent: Dec. 12, 2023

(54) METHOD FOR PROCESSING IRRADIATION FORECAST, METHOD FOR TRAINING STACKED GENERALIZATION MODEL, AND APPARATUSES THEREOF

(71) Applicants: ENVISION DIGITAL INTERNATIONAL PTE. LTD., Singapore (SG); SHANGHAI ENVISION DIGITAL CO., LTD., Shanghai (CN)

(72) Inventors: Zibo Dong, Singapore (SG); Ying Yao, Shanghai (CN); Yangyang Zhao, Shanghai (CN); Hui Yang, Shanghai (CN); Qingsheng Zhao, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/777,023

(22) PCT Filed: Nov. 13, 2020

(86) PCT No.: PCT/SG2020/050656
§ 371 (c)(1),
(2) Date: May 14, 2022

(87) PCT Pub. No.: WO2021/096429
PCT Pub. Date: May 20, 2021

(65) Prior Publication Data
US 2022/0397700 A1     Dec. 15, 2022

(30) Foreign Application Priority Data
Nov. 14, 2019  (CN) .......................... 201911112640.0

(51) Int. Cl.
| | |
|---|---|
| G06N 20/00 | (2019.01) |
| H02J 3/00 | (2006.01) |
| G06Q 10/04 | (2023.01) |
| G01W 1/10 | (2006.01) |
| H02J 3/38 | (2006.01) |

(52) U.S. Cl.
CPC .............. G06Q 10/04 (2013.01); G01W 1/10 (2013.01); G06N 20/00 (2019.01); H02J 3/004 (2020.01); H02J 3/381 (2013.01); H02J 2300/24 (2020.01)

(58) Field of Classification Search
CPC .......... G01W 1/10; G06N 20/00; H02J 3/004; H02J 2300/24
See application file for complete search history.

(56) References Cited

U.S. PATENT DOCUMENTS

2012/0191351 A1*  7/2012  Kerrigan ................. H02J 3/004
                                                              702/3
2018/0275314 A1     9/2018  Pavlovski et al.

FOREIGN PATENT DOCUMENTS

| CN | 109543721 A | 3/2019 |
|---|---|---|
| JP | 2006330935 A | 12/2006 |

(Continued)

OTHER PUBLICATIONS

International Search Report and Written Opinion of International Searching Authority dated Feb. 16, 2021 for International Application No. PCT/SG2020/050656.

(Continued)

*Primary Examiner* — Manuel A Rivera Vargas
(74) *Attorney, Agent, or Firm* — JCIP; Joseph G. Chu; Jeremy I. Maynard (57) ABSTRACT

Disclosed is a method for processing an irradiation forecast. The method includes: acquiring irradiation forecast data corresponding to a target time period; calling a stacked generalization model including a first-layer generalizer and (Continued)

a second-layer generalizer; determining, using the first-layer generalizer, intermediate forecast data based on the irradiation forecast data corresponding to the target time period; and determining, using the second-layer generalizer, an output forecast value corresponding to the target time period based on the intermediate forecast data. In a technical solution according to an embodiment of the present disclosure, a method for processing an irradiation forecast is achieved. In addition, in a technical solution according to the embodiment of the present disclosure, intermediate forecast data outputted by the first-level generalizer acts as an input of the second-level generalizer, such that a deviation of an output result of the first-layer generalizer is reduced by the second-layer generalizer, thereby reducing processing overhead of a server while further improving the accuracy of plane of array irradiation.

12 Claims, 6 Drawing Sheets

(56) References Cited

FOREIGN PATENT DOCUMENTS

| | | |
|---|---|---|
| JP | 2013253805 A | 12/2013 |
| JP | 2014015457 A | 1/2014 |
| WO | 2011158363 A1 | 12/2011 |
| WO | 2016210102 A1 | 12/2016 |

OTHER PUBLICATIONS

International Preliminary Report on Patentability dated May 10, 2021 for International Application No. PCT/SG2020/050656.
Extended European Search Report dated Dec. 22, 2022 for European Application No. 20886189.8.
Wolpert D H Ed—Roy Asim et al: "Stacked Generalization", Neural Networks, Elsevier Science Publishers, Barking, GB, vol. 5, No. 2, Jan. 1, 1992 (Jan. 1, 1992), pp. 241-259, XP000263557, ISSN: 0893-6080, DOI: 10.1016/S0893-6080(05)80023-1 * p. 1-p. 2; figure 1.
Methods for Processing Solar Radiation Predictions, Methods for Training Stacked Generalized Models, and Apparatuses Therefor, Jan. 24, 2019, 133-139.
Office Action dated Oct. 26, 2022 for Japanese Application No. 2022-527108.
Examination Report No. 1 dated Mar. 1, 2023 for Australian Application No. 2020382454.
Notice of Reasons for Refusal dated May 31, 2023 for Japanese Application No. 2022-527108.
David H. Wolpert, Stacked Generalization, Neural Networks, vol. 5, 1992, pp. 241 to 259.
Search Report dated Jul. 17, 2023 for Chilean Application No. 202201232.

\* cited by examiner

METHOD FOR PROCESSING IRRADIATION FORECAST, METHOD FOR TRAINING STACKED GENERALIZATION MODEL, AND APPARATUSES THEREOF

TECHNICAL FIELD

The present disclosure relates to the field of photovoltaic power generation, and more particularly to a method for processing an irradiation forecast, a method for training a stacked generalization model, and apparatuses thereof.

BACKGROUND

As solar energy is being increasingly explored and researched, the photovoltaic power generation technology becomes maturing.

At present, the meteorological observatory is capable of forecasting solar plane of array (POA) irradiation, and photovoltaic power generation enterprises perform forecast calculation on power of the solar energy based on POA irradiation forecast data from the meteorological observatory, to obtain forecast power.

However, the forecast power calculated by the photovoltaic power generation enterprises has errors, due to errors in the forecast of the solar POA irradiation by the meteorological observatory.

SUMMARY

Embodiments of the present disclosure provide a method for processing an irradiation forecast, a method for training a stacked generalization model, and apparatuses thereof, which may solve the technical problem in related art that a great error may be present in a forecast of solar plane of array (POA) irradiation. The technical solutions are described below.

In an aspect, the embodiments of the present disclosure provide a method for processing an irradiation forecast.

acquiring irradiation forecast data corresponding to a target time period, wherein the irradiation forecast data corresponding to the target time period includes at least one forecast value of POA irradiation within the target time period, at least one forecast value being provided by at least one information source;
calling a stacked generalization model including a first-layer generalizer and a second-layer generalizer;
determining, by the first-layer generalizer, intermediate forecast data based on the irradiation forecast data corresponding to the target time period; and
determining, by the second-layer generalizer, an output forecast value corresponding to the target time period based on the intermediate forecast data.

In another aspect, the embodiments of the present disclosure provide a method for training a stacked generalization model including a first-layer generalizer and a second-layer generalizer according to the present disclosure. The method includes:

constructing n training samples, wherein each of the n training samples includes irradiation forecast data corresponding to one historical time period and a measurement value of POA irradiation within the historical time period, the irradiation forecast data corresponding to the historical time period includes at least one forecast value of the POA irradiation within the historical time period, at least one forecast value being provided by at least one information source, and n is an integer greater than 1; and
training the stacked generalization model using the n training samples to obtain a trained stacked generalization model.

In still another aspect, the embodiments of the present disclosure provide an apparatus for processing an irradiation forecast. The apparatus includes:

a data acquiring module, configured to acquire irradiation forecast data corresponding to a target time period, where the irradiation forecast data corresponding to the target time period includes at least one forecast value of POA irradiation within the target time period provided by at least one information source;
a model calling module, configured to call a stacked generalization model including a first-layer generalizer and a second-layer generalizer;
a data determining module, configured to determine, using the first-layer generalizer, intermediate forecast data based on the irradiation forecast data corresponding to the target time period; and
a forecast value determining module, configured to determine, using the second-layer generalizer, an output forecast value corresponding to the target time period based on the intermediate forecast data.

In yet still another aspect, the embodiments of the present disclosure provide an apparatus for training a stacked generalization model including a first-layer generalizer and a second-layer generalizer according to the present disclosure. The apparatus includes:

a sample constructing module, configured to construct n training samples, wherein each of the n training samples includes irradiation forecast data corresponding to one historical time period and a measurement value of POA irradiation within the historical time period, the irradiation forecast data corresponding to the historical time period includes at least one forecast value of the POA irradiation within the historical time period, the at least one forecast value being provided by at least one information source, and n is an integer greater than 1; and
a model training module, configured to train the stacked generalization model using the n training samples to obtain a trained stacked generalization model.

In yet still another aspect, the embodiments of the present disclosure provide a computer device. The computer device includes a processor and a memory. The memory stores a computer program. The computer program, when loaded and run by the processor, enables the processor to perform the method for processing the irradiation forecast and the method for training the stacked generalization model as described above.

In another aspect, the embodiments of the present disclosure provide a non-transitory computer-readable storage medium storing a computer program therein. The computer program, when loaded and run by a processor, enables the processor to perform the method for processing the irradiation forecast and the method for training the stacked generalization model as described above.

In yet still another aspect, the embodiments of the present disclosure provide a computer program product. The computer program product, when run by a processor, enables the processor to perform the method for processing the irradiation forecast and the method for training the stacked generalization model as described above.

In the technical solutions according to the embodiments of the present disclosure, a method for processing an irradiation forecast is achieved by calling a stacked generalization model and determining an output forecast value based on forecast values of POA irradiation, wherein the forecast values being provided by a plurality of information sources. In addition, accurate forecast values of the POA irradiation are obtained after processing, thereby improving the accuracy of forecast power of solar radiation determined based on the forecast values of the POA irradiation. Besides, in the technical solutions according to the embodiments of the present disclosure, the stacked generalization model includes two layers of generalizers respectively called as: a first-layer generalizer and a second-layer generalizer. Intermediate forecast data outputted by the first-layer generalizer acts as an input of the second-layer generalizer. In this case, a deviation of the output result of the first-layer generalizer is reduced by the second-layer generalizer. Therefore, processing overhead of a server is reduced while the accuracy of the forecast value of the POA irradiation is further improved.

BRIEF DESCRIPTION OF THE DRAWINGS

The drawings to be used in the description of the embodiments will be described briefly as follows, such that the technical solutions according to the embodiments of the present disclosure will become clearer. It is apparent that the drawings in the following description only illustrate some embodiments of the present disclosure. For those skilled in the art, other drawings may be obtained according to these drawings without any creative work.

DETAILED DESCRIPTION

Figure 1:
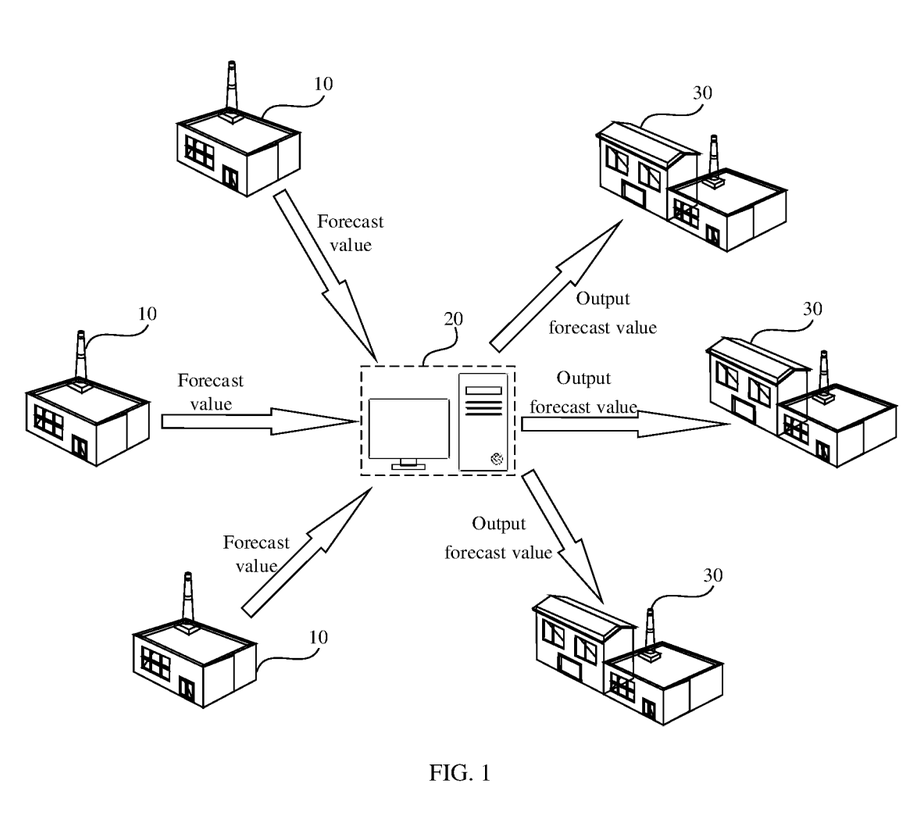
FIG. 1 is a schematic diagram of an implementation environment according to an embodiment of the present disclosure.

The present disclosure will be described in further detail with reference to the drawings, to present the objects, technical solutions, and advantages of the present disclosure more clearly, FIG. 1 illustrates a schematic diagram of an implementation environment according to an embodiment of the present disclosure. The implementation environment may include at least one meteorological observatory 10, a computer device 20 and at least one photovoltaic power generation enterprise 30.

The at least one meteorological observatory 10 is configured to observe meteorology phenomena and release a meteorology forecast, for example, release a solar plane of array (POA) irradiation forecast. The at least one meteorological observatory 10 may include one or more meteorological observatories 10. Alternatively, in order to output an accurate forecast value, a plurality of meteorological observatories 10 may be adopted to obtain a plurality of forecasts, such as a plurality of POA irradiation forecasts. Alternatively, the at least one meteorological observatory 10 may include the European Centre for Medium-range Weather Forecasts (ECMWF), the Weather Company of International Business Machines Corporation (IBM), National Centers for Environmental Prediction (NCEP), and the like.

The computer device 20 is an apparatus capable of transmitting and processing data, such as a server with calculation and storage functions, a terminal including a mobile phone, a tablet computer, a multimedia player, a wearable apparatus and the like, and other computer devices. Alternatively, in the case where the computer device is a server, the computer device may be a server, a server cluster composed of a plurality of servers, or a cloud computing service center. In the embodiment according to the present disclosure, the computer device 20 is configured to acquire historical meteorological forecasts and historical meteorological measurement values of the meteorological observatory 10, and train a deep learning model with these historical meteorological forecasts and historical meteorological measurement values. The deep learning model includes a neural network model, a stacked generalization model, a linear regression model and the like. The computer device 20 is further configured to input the acquired meteorological forecasts to the trained deep learning model to obtain an output forecast value, and send the output forecast value to the at least one photovoltaic power generation enterprise 30.

The at least one photovoltaic power generation enterprise 30 is configured to predict power and release forecast power, for example, release forecast power of solar irradiation. The at least one photovoltaic power generation enterprise 30 may include one or more photovoltaic power generation enterprises 30, which is not limited in the embodiment of the present disclosure. Alternatively, the computer device 20 may be arranged in the photovoltaic power generation enterprise 30 or be independent of the photovoltaic power generation enterprise 30, which is not limited in the embodiment of the present disclosure.

In some embodiments, in order to obtain more accurate forecast power of solar irradiation, the plurality of meteorological observatories 10 respectively send their forecast values of POA irradiation within a target time period to the computer device 20. Then, the computer device 20 inputs the plurality of forecast values to a trained stacked generalization model, obtains an output forecast value corresponding to the target time period by calculation, and sends the output forecast value to the photovoltaic power generation enterprise 30. Finally, the photovoltaic power generation enterprise 30 calculates forecast power of solar irradiation based on the output forecast value.

For ease of description, the following embodiments of methods are only described by assuming that steps are performed by a server and the deep learning model is the stacked generalization model, which is not limited thereto.

Figure 2:
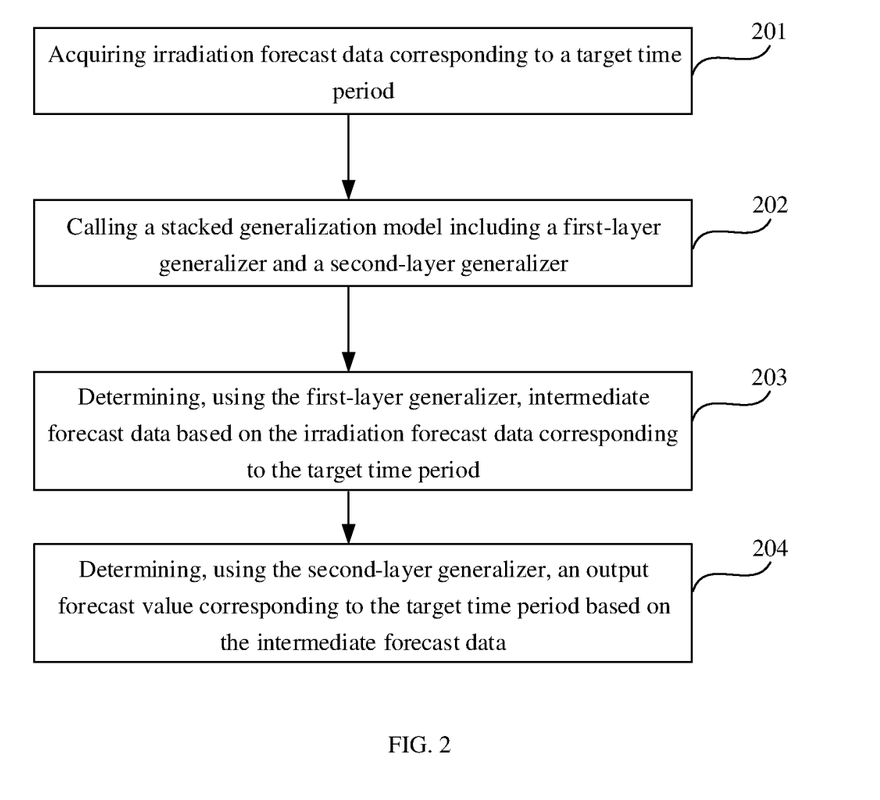
FIG. 2 is a flowchart of a method for processing an irradiation forecast according to an embodiment of the present disclosure.

FIG. 2 illustrates a flowchart of a method for processing an irradiation forecast according to an embodiment of the method. The method may include steps 201 to 204.

In step 201, irradiation forecast data corresponding to a target time period is acquired.

The target time period is a future time period after a current time instant. The duration of the target time period is not limited in the embodiment according to the present disclosure. Alternatively, the target time period may be one day, half a day, and midday time period, such as a time period from 11:00 AM to 13:00 PM.

Alternatively, the irradiation forecast data corresponding to the target time period includes: at least one forecast value of plane of array (POA) irradiation within the target time period, wherein the at least one forecast value is provided by at least one information source. The POA irradiation is an important parameter for describing and researching solar radiation, also called as solar irradiation, solar irradiance, solar irradiation amount and the like. The POA irradiation indicates radiation energy of solar radiation received in a unit area on the surface of the earth within a certain time period, after the solar radiation is absorbed, scattered and emitted by the atmosphere. The unit of the POA irradiation is watts/square meter ($W/m^2$). Hence, the forecast value of the POA irradiation corresponding to the target time period indicates irradiation energy of solar radiation received in a unit area on the surface of the earth within the target time period, after the solar radiation is effected by the atmosphere. The unit of the forecast value of the POA irradiation corresponding to the target time period is also watts/square meter. The information source may be the above meteorological observatory, and for related explanation, reference may be made the embodiment of the implementation environment, which is not repeated hereinafter.

In step 202, a stacked generalization model is called. The stacked generalization model includes a first-layer generalizer and a second-layer generalizer.

The stacked generalization model is a deep learning model, and may be abbreviated as a stacked model. The stacking generalization model includes at least two layers of learners. With more layers of learners, the learning depth of the stacked generalization model is deeper, a result obtained by the stacked generalization model is more accurate, and processing overhead of a server is also increased. Therefore, in actual applications, the number of layers of the stacked generalization model is determined on two factors: the accuracy of the result and the processing overhead of the server. Alternatively, the learner included in the stacked generalization model may be a generalizer. In the embodiment according to the present disclosure, by considering the accuracy of the result and the processing overhead of the server, it is determined that the stack generalization model includes two layers of generalizers respectively called as a first-layer generalizer and a second-layer generalizer. Specifically, an output of the first-layer generalizer acts as an input of the second-layer generalizer.

It should be noted that, after understanding the technical solutions according to the embodiments of the present disclosure, those skilled in the art may readily appreciate the following solutions to complete all or part of functions described in the embodiment of the present disclosure. The solutions include that: the stacked generalization model may be replaced with other deep learning models such as a generalization model (a learning model only containing one layer of generalizers), and it may be increased the number of layers of the learners included in the stacked generalization model, for example, three layers of learners are arranged. All of the solutions should fall within the scope of protection of the present disclosure.

In step 203, intermediate forecast data is determined using the first-layer generalizer based on the irradiation forecast data corresponding to the target time period.

The intermediate forecast data indicates at least one forecast value of the POA irradiation within the target time period, which is obtained using the first-layer generalizer by a server by means of a further prediction based on the irradiation forecast data corresponding to the target time period. Specifically, the forecast values of the POA irradiation within the target time period obtained via the further prediction are called as intermediate forecast values.

Alternatively, the first-layer generalizer may include a plurality of generalizers. The plurality of generalizers may be all the same, different from one another, or may be partially the same and partially different, which is not limited in the embodiment of the present disclosure. Specifically, each of the plurality of generalizers corresponds to a learning model. The learning model may be, for example, a random forest (RF) model, a Ridge model, an extreme gradient boost (XGB) model, a least absolute shrinkage and selection operator (Lasso) regression model, a support vector machine (SVM) model, an adaptive boosting (Adaboost) model, a locally weighted linear regression (LWLR) model, and a deep neural networks (DNN) model. Alternatively, in the case where the first-layer generalizer includes a plurality of generalizers, and the plurality of generalizers are partially the same and partially different, or are all the same, parameters for the same generalizers may be the same or different, which is not limited in the embodiment of the present disclosure.

In some embodiments, the above first-layer generalizer includes k generalizers, with k being an integer greater than 1, such that intermediate forecast data calculated using the first-layer generalizer is more accurate. In this case, the step that the intermediate forecast data is determined based on the irradiation forecast data corresponding to the target time period using the first-layer generalizer includes: obtaining, respectively by the k generalizers, k intermediate forecast values based on the irradiation forecast data corresponding to the target time period. The intermediate forecast data includes the k intermediate forecast values. Each of the k generalizers only outputs one intermediate forecast value even irradiation forecast data corresponding to a plurality of target time periods is input, wherein the forecast value is provided by a plurality of information sources. Therefore, only k intermediate forecast values are outputted by the k generalizers.

In step 204, an output forecast value corresponding to the target time period is determined using the second-layer generalizer based on the intermediate forecast data.

In the case where the second-layer generalizer includes one generalizer, an output forecast value corresponding to the target time period determined using the second-layer generalizer is a predicted value of solar irradiation outputted by the stacked generalization model. In the embodiment of the present disclosure, the irradiation forecast data corresponding to the target time period provided by the information source is further processed using the stacked generalization model including two layers of generalizers. Therefore, the output forecast value corresponding to the target time period is more accurate than the irradiation forecast data provided by the information source.

It should be noted that, the embodiment of the present disclosure is illustrated only by taking an example that the second-layer generalizer includes one generalizer. After understanding the technical solutions of the present disclosure, those skilled in the art will readily appreciate a technical solution that the second-layer generalizer includes a plurality of generalizers, all of which should fall within the scope of protection of the present disclosure. For example, it will be readily appreciated by those skilled in the art that, a third-layer generalizer including one generalizer needs to be added in the stacked generalization model in the case where the second-layer generalizer includes a plurality of generalizers. Alternatively, a t-th layer generalizer including one generalizer needs to be added in the stacked generalization model in the case where a (t-1)-th layer generalizer includes a plurality of generalizers, to ensure that a final output forecast value of the stacked generalization model is a determined value, t being a positive integer greater than 3.

In some embodiments, after step 204, the method further includes: calling a power curve model and calculating forecast power of solar radiation within the target time period based on the output forecast value.

The forecast power is an important parameter for describing the solar radiation, and indicates radiation energy of solar radiation received on the surface of the earth within a certain time period after the solar radiation is effected by the atmosphere, of which the unit is watt (W). In this case, the forecast power of the solar radiation within the target time period is radiation energy of the solar radiation received on the surface of the earth within the target time period after the solar radiation is effected by the atmosphere, of which the unit is also watts (W). The power curve model indicates a model for calculating the forecast power of the solar radiation based on the forecast value of the POA irradiation. Alternatively, the power curve model is a nonlinear model.

In summary, in the technical solutions according to the embodiments of the present disclosure, an output forecast value is determined based on forecast values of POA irradiation provided by a plurality of information sources by calling a stacked generalization model. In this way, a method for processing an irradiation forecast is realized, with which an accurate forecast value of the POA irradiation is obtained, thereby improving the accuracy of forecast power of solar radiation determined based on the forecast value of the POA irradiation. Besides, in the technical solutions according to the embodiments of the present disclosure, the stacked generalization model includes two layers of generalizers respectively called as a first-layer generalizer and a second-layer generalizer. Intermediate forecast data outputted by the first-layer generalizer acts as an input of the second-layer generalizer, and a deviation of an output result of the first-layer generalizer is reduced by the second-layer generalizer. Therefore, processing overhead of a server is reduced while the accuracy of the forecast value of the POA irradiation is further improved.

In addition, in the technical solutions according to the embodiments of the present disclosure, the first-layer generalizer includes a plurality of generalizers. Hence, the forecast value of the POA irradiation provided by the information source is processed using the plurality of generalizers, to further reduce the deviation of the output result of the first-layer generalizer and further improve the accuracy of the output forecast value obtained after processing by the stacked generalization model is completed.

Besides, in the technical solutions according to the embodiments of the present disclosure, after the output forecast value is obtained after the processing by the stacked generalization model is completed, a power curve model may be further called by the server to determine forecast power based on the output forecast value. Accordingly, the output forecast value of the POA irradiation is applied to many scenarios, and photovoltaic power generation enterprises are allowed to obtain accurate forecast power of the solar radiation.

In some embodiments, the stacked generalization model is trained by: constructing n training samples; and training the stacked generalization model using the n training samples to obtain a trained stacked generalization model, where n is an integer greater than 1.

The training samples are for training the stacked generalization model. Since irradiation forecast data within one historical time period may be provided simultaneously by a plurality of information sources, one historical time period may correspond to one training sample or a plurality of training samples. Specifically, each of the training samples includes irradiation forecast data corresponding to one historical time period, and a measurement value of POA irradiation within the historical time period. The irradiation forecast data corresponding to the historical time period includes: at least one forecast value of the POA irradiation within the historical time period, wherein the at least one forecast value is provided by at least one information source. The measurement value of the POA irradiation within the historical time period indicates a determined value of the POA irradiation within the historical time period obtained by measurement and calculation. Since the irradiation forecast data within one historical time period may be simultaneously provided by a plurality of information sources, each historical time period corresponds to one measurement value of the POA irradiation and at least one forecast value of the POA irradiation. That is, one measurement value of the POA irradiation may correspond to at least one forecast value of the POA irradiation within a certain historical time period.

Alternatively, training the stacked generalization model using the n training samples to obtain the trained stacked generalization model includes steps I to IV.

In step I, m training samples are chosen from the n training samples.

The m training samples may be randomly chosen from the n training samples, or may be chosen from the n training samples in accordance with a preset choosing rule, which is not limited in the embodiment of the present disclosure. Specifically, m is a positive integer greater than 1 and less than n. Alternatively, in order to facilitate and accelerate the choosing of the m training samples by a server, the m training samples are chosen from the n training samples by: dividing the n training samples into s parts of training samples, choosing t parts of training samples from the s portions of training samples and taking the t parts of training samples as the m training samples, where s is a positive integer greater than 1, and t is a positive integer less than s. The n training samples may be divided into the s parts of training samples by the server randomly or in accordance with a preset classification rule. For example, the n training samples are divided into the s parts of training samples based on historical time periods corresponding to the n training samples. For another example, the n training samples are divided into the s parts of training samples based on sources of the information sources, which is not limited in the embodiment of the present disclosure. In addition, the number of training samples contained in each part of training samples of the s parts of training samples may be the same as or different from that of training samples contained in another part of training samples of the s parts of training samples, that is, the n training samples may be equally divided into s parts by the server.

In step II, the first-layer generalizer is trained using irradiation forecast data of the m training samples and measurement values of the in training samples, to obtain a trained first-layer generalizer.

In step III, intermediate forecast data of n-m training samples is determined using the first-layer generalizer based on irradiation forecast data of the n-m training samples. The n-m training samples are training samples, other than the m training samples, in the n training samples.

Upon completion of training the first-layer generalizer, the server inputs the irradiation forecast data of the n-m training samples to the trained first-layer generalizer to obtain intermediate forecast data of the n-m training samples. The n-m training samples are the training samples, other than the m training samples for training the first-layer generalizer, in the n training samples.

Alternatively, the first-layer generalizer may contain a plurality of generalizers. The server may determine, using each of the generalizers of the first-layer generalizer, intermediate forecast values of the n-m training samples based on irradiation forecast data of the n-m training samples. The n-m training samples are the training samples, other than the m training samples, in the n training samples. The intermediate forecast data includes a plurality of intermediate forecast values.

Alternatively, in the case where the server divides the n training samples into s parts of training samples and chooses t parts of training samples from the s parts of training samples as the m training samples, the server inputs, after completing training the first-layer generalizer, irradiation forecast data of s-t parts of training samples to the trained first-layer generalizer, to obtain intermediate forecast data of the s-t parts of training samples. The s-t parts of training samples are the training samples, other than the t parts of training samples, in the s parts of training samples.

In step IV, the second-layer generalizer is trained using the intermediate forecast data and the measurement values of the n-m training samples, to obtain a trained second-layer generalizer.

After obtaining the intermediate forecast data of the n-m training samples, the server may train the second-layer generalizer in conjunction with measurement values of solar radiation of the n-m training samples. Alternatively, after obtaining the n-m training samples, the server may perform a loop-step for a plurality of times, to obtain accurate trained second-layer generalizer. The loop-step indicates a loop from the above step I to step IV. Each time when the loop step is performed by the server, at least a portion of the plurality of training samples chosen from the n training samples are different. If the total number of times that the loop-step is performed by the server is x, after the loop-step is performed for x times, intermediate forecast data of q training samples may be obtained by the server, where q is a positive integer. Then, the second-layer generalizer is trained by adopting the intermediate forecast data of the q training samples and the measurement values of solar irradiation of the q training samples.

For example, after acquiring the n training samples, the server divides the n training samples into 5 parts of training samples, and chooses 4 parts of training samples from the 5 parts of training samples, such as the first part of training samples to the fourth part training samples. The server trains the first-layer generalizer by adopting irradiation forecast data of the 4 parts of training samples and measurement values of solar irradiation of the 4 parts of training samples. Then, the server inputs irradiation forecast data of the fifth part of training samples into the trained first-layer generalizer to obtain intermediate forecast data of the fifth part of training samples. After that, the server may directly train the second-layer generalizer based on the intermediate forecast data of the fifth part of training samples and a measurement value of solar irradiation of the fifth part of training samples to obtain the trained second-layer generalizer. Further, the server may obtain intermediate forecast data of the chosen 4 parts of training samples with steps same as those for obtaining the intermediate forecast data of the fifth part of training samples. Then, the server trains the second-layer generalizer using the intermediate forecast data of the 5 parts of training samples and measurement values of solar irradiation of the 5 parts of training samples, to obtain the trained second-layer generalizer.

In summary, in the technical solutions according to the embodiments of the present disclosure, a method for training a stacked generalization model is achieved by constructing a plurality of training samples and training the stacked generalization model using the training samples. Further, in the technical solutions according to the embodiments of the present disclosure, the stacked generalization model includes two layers of generalizers respectively called as a first-layer generalizer and a second-layer generalizer, and an output result of the first-layer generalizer is optimized using the second-layer generalizer, to reduce a deviation of the stacked generalization model and improve the accuracy of the stacked generalization model. In addition, in the technical solutions according to the embodiments of the present disclosure, the first-layer generalizer includes a plurality of generalizers, with which a deviation of the output result of the first-layer generalizer is reduced, thereby further improving the accuracy of the stacked generalized model.

Figure 3:
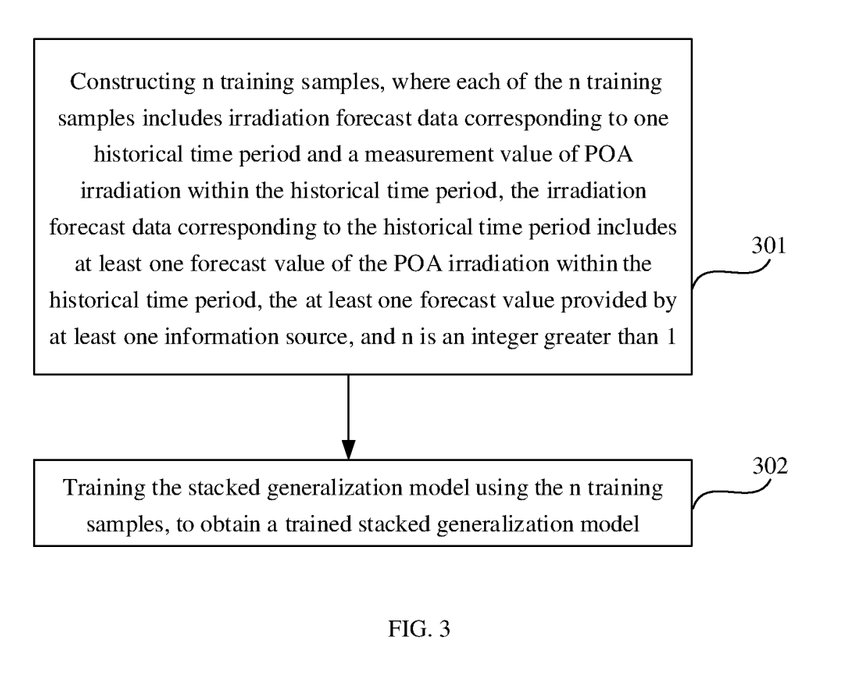
FIG. 3 is a flowchart of a method for training a stacked generalization model according to an embodiment of the present disclosure.

FIG. 3 illustrates a flowchart of a method for training a stacked generalization model according to an embodiment of the present disclosure. The stacked generalization model includes a first-layer generalizer and a second-layer generalizer. The method includes steps 301 to 302.

In step 301, n training samples are constructed, and each of the n training samples includes irradiation forecast data corresponding to one historical time period and a measurement value of plane of array (POA) irradiation within the historical time period. The irradiation forecast data corresponding to the historical time period includes: at least one forecast value of the POA irradiation within the historical time period, wherein the at least one forecast value is provided by at least one information source, and n is an integer greater than 1.

In step 302, the stacked generalization model is trained using the n training samples, to obtain a trained stacked generalization model.

In some embodiments, the above step 302 includes: choosing m training samples from the n training samples, wherein in is a positive integer greater than 1 and less than n; training the first-layer generalizer using irradiation forecast data of the m training samples and measurement values of the m training samples, to obtain a trained first-layer generalizer; determining, using the first-layer generalizer, intermediate forecast data of n-m training samples based on irradiation forecast data of the n-m training samples, the n-m training samples being the training samples, other than the in training samples, in the n training samples; and training the second-layer generalizer using the intermediate forecast data of the n-m training samples and measurement values of the n-m training samples, to obtain a trained second-layer generalizer.

The method for training the stacked generalization model according to the embodiment shown in FIG. 3 is described based on the description of the training process of the stacked generalization model in the embodiment shown in FIG. 2. Therefore, the training process related to the stacked generalization model please refer to the description of the embodiment shown in the above FIG. 2, and will not repeated hereinafter.

In summary, in the technical solutions according to the embodiments of the present disclosure, a method for training a stacked generalization model is achieved by constructing a plurality of training samples and training the stacked generalization model using the training samples. Further, in the technical solutions according to the embodiments of the present disclosure, the stacked generalization model includes two layers of generalizers respectively called as a first-layer generalizer and a second-layer generalizer, and an output result of the first-layer generalizer is optimized by the second-layer generalizer, to reduce a deviation of the stacked generalization model and improve the accuracy of the stacked generalization model. In addition, in the technical solutions according to the embodiments of the present disclosure, the first-layer generalizer includes a plurality of generalizers, with which a deviation of the output result of the first-layer generalizer is reduced, thereby further improving the accuracy of the stacked generalized model.

Figure 4:
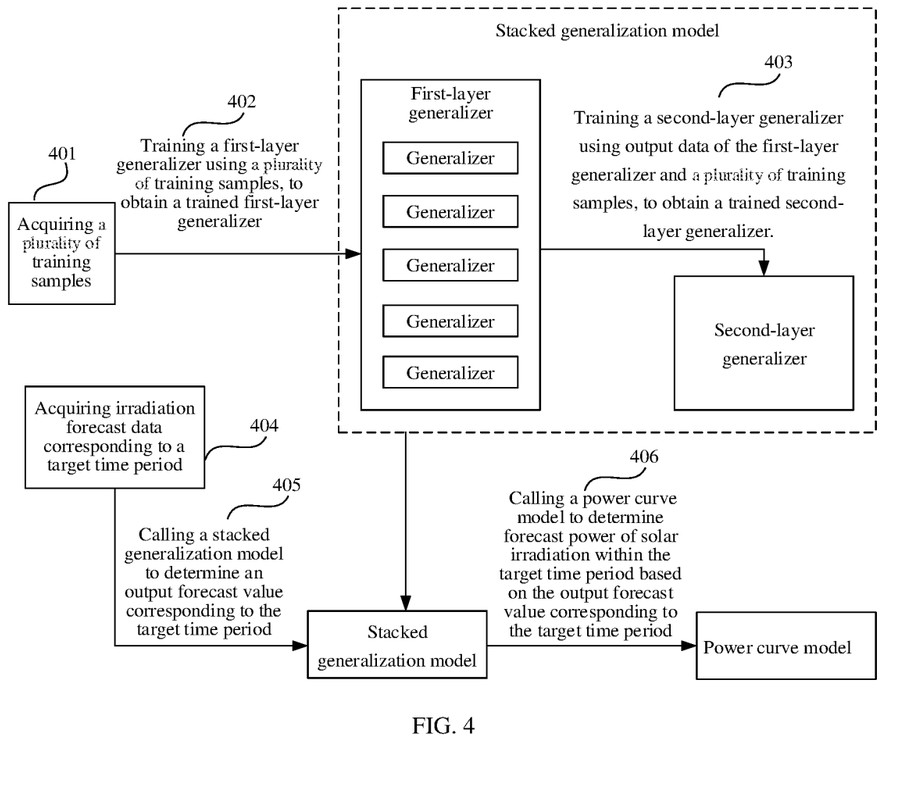
FIG. 4 is a flowchart of a method for processing an irradiation forecast according to another embodiment of the present disclosure.

FIG. 4 illustrates a flowchart of a method for processing an irradiation forecast according to an embodiment of the present disclosure. The method includes steps 401 to 404.

In step 401, a plurality of training samples are acquired. Each of the training samples includes irradiation forecast data corresponding to one historical time period and a measurement value of plane of array (POA) irradiation within the historical time period. The irradiation forecast data corresponding to the historical time period includes at least one forecast value of the POA irradiation within the historical time period, wherein the at least one forecast value is provided by at least one information source.

In step 402, a first-layer generalizer is trained using a plurality of training samples, to obtain a trained first-layer generalizer. The first-layer generalizer may include a plurality of generalizers.

In step 403, a second-layer generalizer is trained using output data of the first-layer generalizer and a plurality of training samples, to obtain a trained second-layer generalizer.

In step 404, irradiation forecast data corresponding to a target time period is acquired, which includes at least one forecast value of POA irradiation within the target time period, wherein the at least one forecast value is provided by at least one information source.

In step 405, a stacked generalization model is called to determine an output forecast value corresponding to the target time period. The stacked generalization model includes a first-layer generalizer and a second-layer generalizer.

In step 406, a power curve model is called to determine forecast power of solar irradiation within the target time period based on the output forecast value corresponding to the target time period.

Below, embodiments of apparatuses according to the present disclosure are described, which may be used to perform the embodiments of methods according to the present disclosure. Details not disclosed in the embodiments of apparatuses according to the present disclosure please refer to the embodiments of methods according to the present disclosure.

Figure 5:
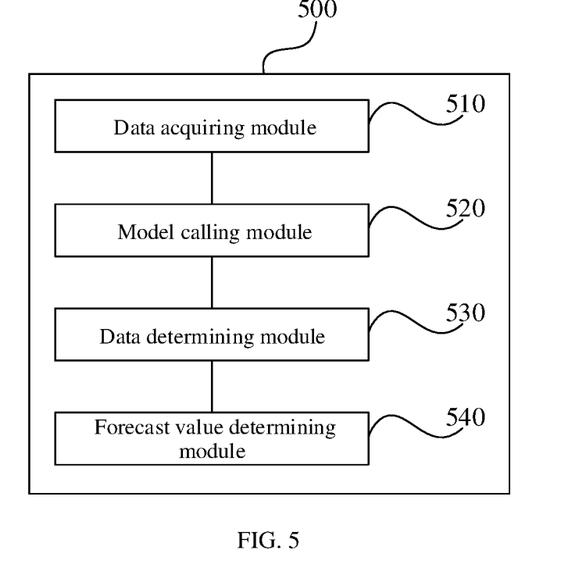
FIG. 5 is a block diagram of an apparatus for processing an irradiation forecast according to an embodiment of the present disclosure.

FIG. 5 illustrates a block diagram of an apparatus for processing an irradiation forecast according to an embodiment of the present disclosure. A device 500 has a function of realizing the above embodiments of methods. The function can be realized by hardware, or by software executed by hardware. The device 500 may be the computer device described above, such as a server. The device 500 may include: a data acquiring module 510, a model calling module 520, a data determining; module 530, and a forecast value determining module 540.

The data acquiring module 510 is configured to acquire irradiation forecast data corresponding to a target time period. The irradiation forecast data includes at least one forecast value of plane of array (POA) irradiation within the target time period, wherein the at least one forecast value is provided by at least one information source.

The module calling module 520 is configured to call a stacked generalization model including a first-layer generalizer and a second-layer generalizer.

The data determining module 530 is configured to determine, using the first-layer generalizer, intermediate forecast data based on the irradiation forecast data corresponding to the target time period.

The forecast value determining module 540 is configured to determine, using the second-layer generalizer, an output forecast value corresponding to the target time period based on the intermediate forecast data.

Alternatively, the first-layer generalizer includes k generalizers, where k is an integer greater than 1, In this case, the data determining module 530 is configured to obtain, respectively using the k generalizers, k intermediate forecast values based on the irradiation forecast data corresponding to the target time period. The intermediate forecast data includes the k intermediate forecast values.

Alternatively, the stacked generalization model is trained in a way of constructing n training samples, each of the n training samples including irradiation forecast data corresponding to one historical time period and a measurement value of POA irradiation within the historical time period, and n being an integer greater than 1; and training the stacked generalization model using the n training samples to obtain a trained stacked generalization model.

Alternatively, training the stacked generalization model using the n training samples to obtain the trained stacked generalization model includes: choosing m training samples from the n training samples, in being a positive integer greater than 1 and less than n; training the first-layer generalizer using irradiation forecast data of the m training samples and measurement values of them training samples, to obtain a trained first-layer generalizer; determining, using the first-layer generalizer, intermediate forecast data of n-m training samples based on irradiation forecast data of the n-m training samples, the n-m training samples being training samples, other than them training samples, in then training samples; and training the second-layer generalizer using the intermediate forecast data of the n-m training samples and measurement values of the n-m training samples; to obtain a trained second-layer generalizer.

Figure 6:
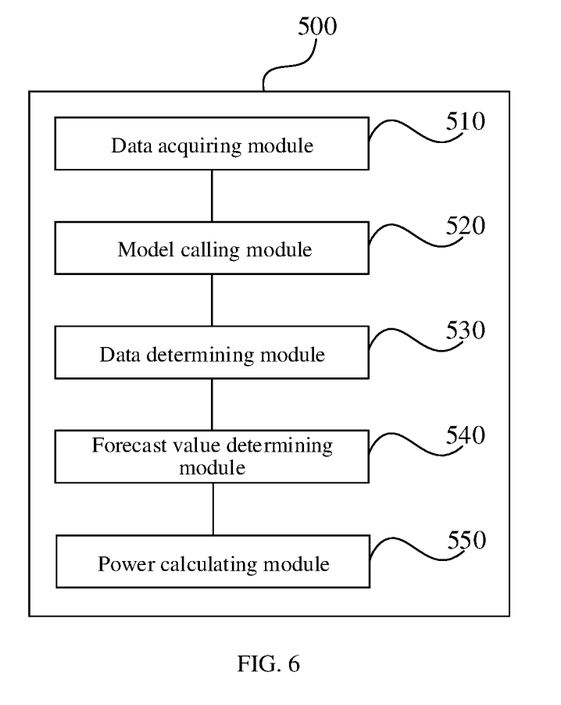
FIG. 6 is a block diagram of an apparatus for processing an irradiation forecast according to another embodiment of the present disclosure.

Alternatively, as shown in FIG. 6, the apparatus 500 further includes a power calculating module 550 configured to call a power curve model and calculate forecast power of solar radiation within the target time period based on the output forecast value.

In summary, in the technical solutions according to the embodiments of the present disclosure, a method for processing an irradiation forecast is achieved by calling a stacked generalization model and determining an output forecast value based on forecast values of POA irradiation provided by a plurality of information sources. In addition, accurate forecast values of the POA irradiation are obtained after processing, thereby improving the accuracy of forecast power of solar radiation determined based on the forecast values of the POA irradiation. Besides, in the technical solutions according to the embodiments of the present disclosure, the stacked generalization model includes two layers of generalizers respectively called as: a first-layer generalizer and a second-layer generalizer. Intermediate forecast data outputted by the first-layer generalizer acts as an input of the second-layer generalizer. In this case, a deviation of the output result of the first-layer generalizer is reduced by the second-layer generalizer. Therefore, processing overhead of a server is reduced while the accuracy of the forecast value of the POA irradiation is further improved.

In addition, in the technical solutions according to the embodiments of the present disclosure, the first-layer generalizer includes a plurality of generalizers. Hence, the forecast value of the POA irradiation provided by the information source is processed using the plurality of generalizers, to further reduce the deviation of the output result of the first-layer generalizer and further improve the accuracy of the output forecast value obtained after processing by the stacked generalization model is completed.

Besides, in the technical solutions according to the embodiments of the present disclosure, once the output forecast value is obtained after the processing by the stacked generalization model is completed, a power curve model may be further called by the server to determine forecast power based on the output forecast value. Accordingly, the output forecast value of the POA irradiation is applied to many scenarios, and photovoltaic power generation enterprises are allowed to obtain accurate forecast power of the solar radiation.

Figure 7:
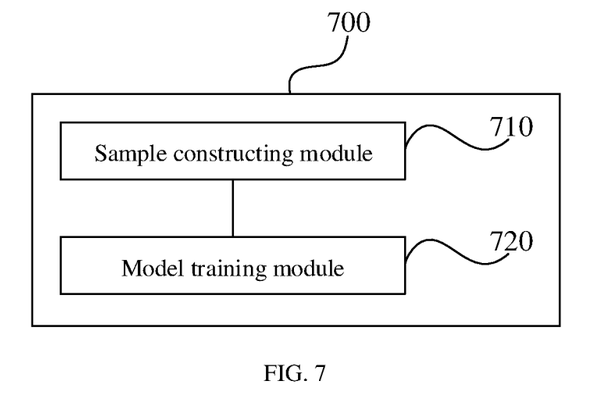
FIG. 7 is a block diagram of an apparatus for training a stacked generalization model according to an embodiment of the present disclosure.

FIG. 7 illustrates a block diagram of an apparatus 70 for training a stacked generalization model according to an embodiment of the present disclosure. The stacked generalization model includes a first-layer generalizer and a second-layer generalizer. The apparatus 700 has a function realizing the above embodiments of the methods. The function may be implemented by hardware or software executed by hardware. The apparatus 700 may be the aforementioned computer device such as a server. The apparatus 700 may include a sample constructing model 710 and a model training module 720.

The sample constructing module 710 is configured to construct n training samples. Each of then training samples includes irradiation forecast data corresponding to one historical time period and a measurement value of plane of array (POA) irradiation within the historical time period. The irradiation forecast data corresponding to the historical time period includes at least one forecast value of the POA irradiation within the historical time period, wherein the at least one forecast value is provided by at least one information source. Specifically, n is an integer greater than 1.

The model training module 720 is configured to train the stacked generalization model using the n training samples to obtain a trained stacked generalization model.

Alternatively, the model training module 720 is configured to: choose m training samples from the n training samples, m being a positive integer greater than 1 and less than n; train the first-layer generalizer using the irradiation forecast data and the measurement values of the in training samples, to obtain a trained first-layer generalizer; determine, using the first-layer generalizer, intermediate forecast data of n-m training samples based on the irradiation forecast data of the n-m training samples, n-m training samples being the training samples, other than the m training samples, in the n training samples; and train the second-layer generalizer using the intermediate forecast data of the n-m training samples and measurement values of the n-m training samples, to obtain a trained second-layer generalizer.

In summary, in the technical solutions according to the embodiments of the present disclosure, a method for training a stacked generalization model is achieved by constructing a plurality of training samples and training the stacked generalization model using the training samples. Further, in the technical solutions according to the embodiments of the present disclosure, the stacked generalization model includes two layers of generalizers respectively called as a first-layer generalizer and a second-layer generalizer, and an output result of the first-layer generalizer is optimized by the second-layer generalizer, to reduce a deviation of the stacked generalization model and improve the accuracy of the stacked generalization model. In addition, in the technical solutions according to the embodiments of the present disclosure, the first-layer generalizer includes a plurality of generalizers, with which a deviation of the output result of the first-layer generalizer is reduced, thereby further improving the accuracy of the stacked generalized model.

It should be noted that, the division of the above functional modules are only taken as an example in implementing the functions of the devices according to the embodiments of the present disclosure. In actual applications, the above functions may be implemented by different functional modules as needed. That is, internal structures of the devices may be divided into functional modules different from those in the above to complete all or part of the above functions. In addition, the embodiments of the devices according to the above embodiments have the same concepts as the embodiments of methods according to the above embodiments, of which implementation processes refer to those of the embodiments of methods in detail, which will not be repeated hereinafter.

Figure 8:
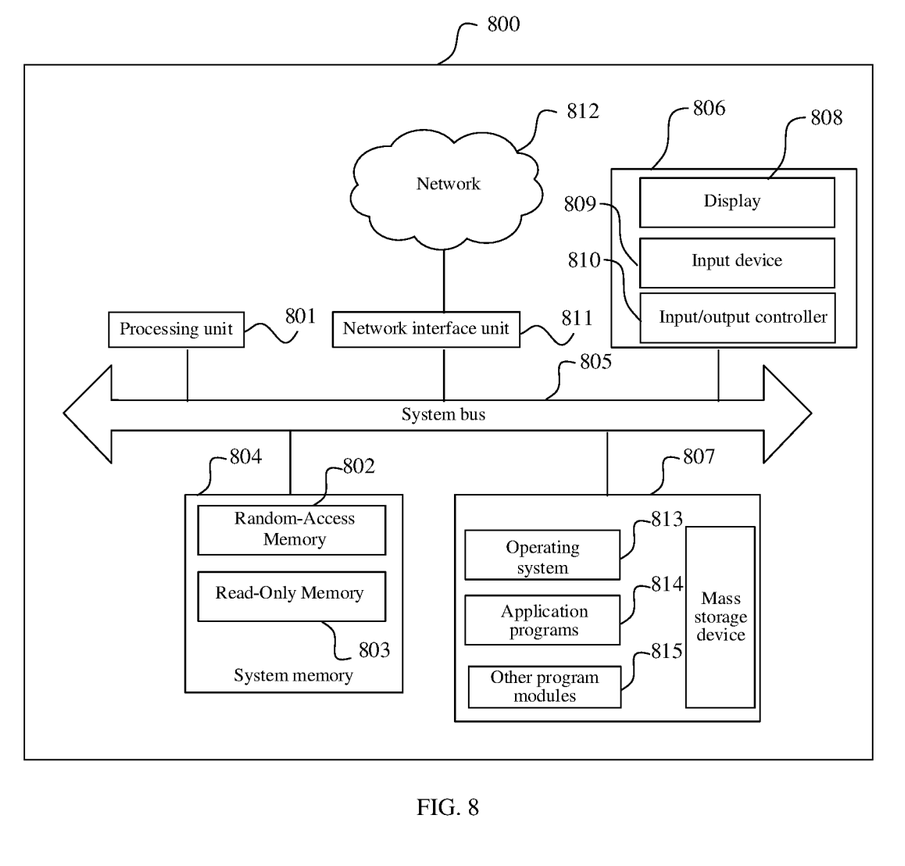
FIG. 8 is a structural block diagram of a computer device according to an embodiment of the present disclosure.

Reference is made to FIG. 8, which illustrates a structural block diagram of a computer device 800 according to an embodiment of the present disclosure. The computer device may be configured to implement at least one of the irradiation forecast processing method and the method for training the stacked generalization model according to the above embodiments. For example, the computer device 800 may be the server in the implementation environment shown in FIG. 1.

The computer device 800 includes a processing unit 801, such as a central processing unit (CPU), a graphics processing unit (GPU), and a field programmable gate array (FPGA), a system memory 804 including a random-access memory (RAM) 802 and a read-only memory (ROM) 803, and a system bus 805 connecting the system memory 804 and the central processing unit 801. The computer device 800 further includes an input/output system (I/O system) 806 helping to transmit information between components in the server, and a mass storage device 807 storing an operating system 813, application programs 814 and other program modules 815.

The I/O system 806 includes a display 808 for displaying information and an input device 809, such as a mouse and a keyboard, for users to input information. The display 808 and the input device 809 are both connected to the central processing unit 801 via an input/output controller 810 connected to the system bus 805. The I/O system 806 may further include the input/output controller 810 for receiving and processing inputs from a plurality of other devices such as the keyboard, the mouse, or an electronic stylus. Similarly, the input/output controller 810 further provides outputs to a display screen, a printer, or other types of output devices.

The mass storage device 807 is connected to the central processing unit 801 via a mass storage controller (not shown) connected to the system bus 805. The mass storage device 807 and computer-readable medium associated thereto provide non-volatile storage for the computer device 800. That is, the mass storage device 807 may include a computer-readable medium (not shown) such as a hard disk or a compact disc read-only memory (CD-ROM) drive.

Without loss of generality, the computer-readable medium may include a computer storage medium and a communication medium. The computer storage medium includes a volatile medium, a nonvolatile medium, a removable medium, and a non-removable medium practiced in any method or technology for storing information such as computer-readable instructions, data structures, program modules or other data. The computer storage medium includes a RAM, a ROM, an erasable programmable read-only memory (EPROM), an electrically erasable programmable read-only memory (EEPROM), a flash memory or other solid-state storage technology, includes a CD-ROM, a digital video disc (DVD) or other optical memory, and includes a cassette, a magnetic tape, a disk storage or other magnetic storage devices. It is appreciated by those skilled in the art that the computer storage medium is not limited to those described in the above. The aforementioned system memory 804 and mass storage device 807 may be collectively referred to as memory.

According to an embodiment of the present disclosure, the computer device 800 may operate by being further connected, via a network such as the Internet, to a remote computer on the network. That is, the computer device 800 may be connected to a network 812 via a network interface unit 811 connected to the system bus 805. Alternatively, the computer device 800 may be connected to other types of networks or remote computer systems (not shown) via the network interface unit 811.

The memory further stores a computer program. The computer program, when executed by one or more processors, enables the one or more processors to perform at least one of the method for processing the irradiation forecast and the method for training the stacked generalization model as described above.

An embodiment of the present disclosure further provides a non-transitory computer-readable storage medium storing a computer program therein. The computer program, when run by a processor, enables the processor to perform at least one of the method for processing the irradiation forecast and the method for training the stacked generalization model as described above.

An embodiment of the present disclosure provides a computer program product. The computer program product, when run by a processor, enables the processor to perform at least one of the method for processing the irradiation forecast and the method for training the stacked generalization model as described above.

It should be understood that, the "a plurality of" mentioned herein indicates two or more. The "and/or" is used for describing an association relationship between associated objects and represents that three relationships may exist. For example, A and/or B may represent three relationships that: A exists independently, both A and B exist and B exits independently. The character "/" generally indicates that associated objects before and after "/" are in an "or" relationship.

Described above are merely exemplary embodiments of the present disclosure, and are not intended to limit the present disclosure. Within the spirit and principles of the present disclosure, any modifications, equivalent substitutions, improvements, and the like should fall within the protection scope of the present disclosure.

What is claimed is:

1. A computer-based method of deep learning model training and processing an irradiation forecast by way of a trained deep learning model, the method comprising:
   receiving from a plurality of meteorological observatories historical irradiation forecast data and historical measurement values;
   training a deep learning model comprising a stacked generalization model with the historical irradiation forecast data and historical measurement values, wherein the stacked generalization model comprises a first-layer generalizer and a second-layer generalizer, wherein each of the first-layer generalizer and the second-layer generalizer is a learning model, and wherein training the stacked generalization model comprises:
      constructing n training samples, each of the n training samples comprising historical irradiation forecast data corresponding to one historical time period and historical measurement values of plane of array irradiation within the historical time period, wherein n is an integer greater than 1;
      choosing m training samples from the n training samples, wherein m is a positive integer greater than 1 and less than n;
      training the first-layer generalizer using historical irradiation forecast data of the m training samples and measurement values of the m training samples, to obtain a trained first-layer generalizer;
      determining intermediate historical forecast data of n-m training samples based on historical irradiation forecast data of the n-m training samples using the trained first-layer generalizer, the n-m training samples being the training samples other than the m training samples in the n training samples; and
      training the second-layer generalizer using the intermediate forecast data of the n-m training samples and historical measurement values of the n-m training samples to obtain a trained second-layer generalizer;
   acquiring from at least one meteorological observatory irradiation forecast data corresponding to a target time period, wherein the irradiation forecast data corresponding to the target time period comprises at least one forecast value of plane of array irradiation within the target time period;
   calling the stacked generalization model;
   determining intermediate forecast data based on the irradiation forecast data corresponding to the target time period using the first-layer generalizer; and
   determining an output forecast value corresponding to the target time period based on the intermediate forecast data using the second-layer generalizer.

2. The method according to claim 1, wherein the first-layer generalizer comprises k generalizers, where k is an integer greater than 1; and wherein:
   determining the intermediate forecast data based on the irradiation forecast data corresponding to the target time period comprises:
      obtaining, respectively using the k generalizers, k intermediate forecast values based on the irradiation forecast data corresponding to the target time period;
   wherein the intermediate forecast data comprises the k intermediate forecast values.

3. A computer device, comprising a processor and a memory storing a computer program therein, wherein the computer program, when loaded and run by the processor, enables the processor to perform at least one of 1) the method of deep learning model training and processing an irradiation forecast by way of a trained deep learning model as defined in claim 2 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and     training the stacked generalization model using the n training samples to obtain a trained stacked generalization model.

4. A non-transitory computer-readable storage medium storing a computer program therein, wherein the computer program, when executed by a processor, enables the processor to perform at least one of 1) the method of deep learning model training and processing an irradiation forecast by way of a trained deep learning model as defined in claim 2 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and     training the stacked generalization model using the n training samples to obtain a trained stacked generalization model.

5. The method according to claim 1, wherein after determining the output forecast value corresponding to the target time period based on the intermediate forecast data, the method further comprises:

calling a power curve model and calculating forecast power of solar radiation within the target time period based on the output forecast value.

6. A computer device, comprising a processor and a memory storing a computer program therein, wherein the computer program, when loaded and run by the processor, enables the processor to perform at least one of 1) the method of deep learning model training and processing an irradiation forecast by way of a trained deep learning model as defined in claim 5 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and     training the stacked generalization model using the n training samples to obtain a trained stacked generalization model.

7. A non-transitory computer-readable storage medium storing a computer program therein, wherein the computer program, when executed by a processor, enables the processor to perform at least one of 1) the method of deep learning model training and processing an irradiation forecast by way of a trained deep learning model as defined in claim 5 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and     training the stacked generalization model using the n training samples to obtain a trained stacked generalization model.

8. The method of claim 1, further comprising at least one of:

sending the output forecast value to a photovoltaic power generation enterprise; and     calculating and releasing forecast power of solar irradiation for the photovoltaic power generation enterprise based on the output forecast value.

9. A computer device, comprising a processor and a memory storing a computer program therein, wherein the computer program, when loaded and run by the processor, enables the processor to perform at least one of 1) the method of deep learning model training and processing an irradiation forecast by way of a trained deep learning model as defined in claim 1 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and training the stacked generalization model using the n training samples to obtain a trained stacked generalization model.

10. A non-transitory computer-readable storage medium storing a computer program therein, wherein the computer program, when executed by a processor, enables the processor to perform at least one of 1) the method of deep learning model training and processing an irradiation forecast by way of a trained deep learning model as defined in claim 1 and 2) a method of training a deep learning model comprising a stacked generalization model with historical irradiation forecast data and historical measurement values, the stacked generalization model comprising a first-layer generalizer and a second-layer generalizer, the method of training a deep learning model comprising:

constructing training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and training the stacked generalization model using the n training samples to obtain a trained stacked generalization model.

11. A method of training a deep learning model comprising a stacked generalization model with historical irradiation forecast data and historical measurement values, the stacked generalization model comprising a first-layer generalizer and a second-layer generalizer, the method comprising:

constructing n training samples, wherein each of the n training samples comprises historical irradiation forecast data corresponding to one historical time period and a historical measurement value of plane of array irradiation within the historical time period, the historical irradiation forecast data corresponding to the historical time period comprises at least one historical forecast value of the plane of array irradiation within the historical time period, the at least one forecast value being provided by at least one information source, and n is an integer greater than 1; and training the stacked generalization model using the n training samples to obtain a trained stacked generalization model.

12. An apparatus for deep learning model training and processing an irradiation forecast by way of a trained deep learning model, the method comprising:

a data acquiring module, configured Lo acquire irradiation forecast data corresponding to a target time period, wherein the irradiation forecast data corresponding to the target time period comprises at least one forecast value of plane of array irradiation within the target time period, the at least ono forecast value being provided by at least one information source;

a model calling module, configured to call a deep learning model comprising a stacked generalization model comprising a first-layer generalizer and a second-layer generalizer, each of the first-layer generalizer and the second-layer generalizer being a learning model;

a data determining module, configured to determine, using the first-layer generalizer, intermediate forecast data based on the irradiation forecast data corresponding to the target time period;

a forecast value determining module, configured to determine, using the second-layer generalizer, an output forecast value corresponding to the target time period based on the intermediate forecast data;

a sample constructing module configured to construct n training samples, wherein each of the n training samples comprises historical irradiation forecast data corresponding to one historical time period and a historical measurement value of plane of array irradiation within the historical time period, the irradiation forecast data corresponding to the historical time period comprises at least one forecast value of the plane of array irradiation within the historical time period, the at least one forecast value being provided by at least one information source, and n is an integer greater than 1; and a model training module, configured to train the stacked generalization model using the n training samples to obtain a trained stacked generalization model.

* * * * *